Figures 1, 2:
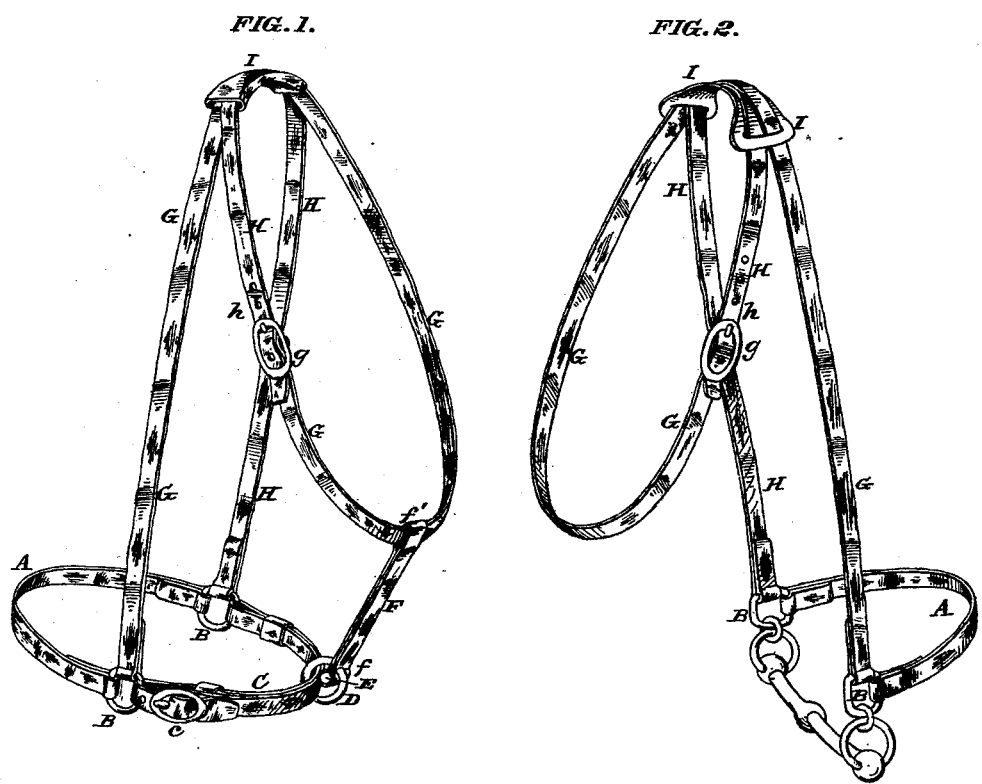

J. STRAUS.
BRIDLES AND HALTERS.

No. 185,985. Patented Jan. 2, 1877.

ATTEST:  
Robert Burns  
Chas J. Gooch

INVENTOR:  
Jacob Straus  
per Knight Bro.  
attys.

UNITED STATES PATENT OFFICE

JACOB STRAUS, OF ST. LOUIS, MISSOURI.

IMPROVEMENT IN BRIDLES AND HALTERS.

Specification forming part of Letters Patent No. 185,985, dated January 2, 1877; application filed November 25, 1876.

*To all whom it may concern:*

Be it known that I, JACOB STRAUS, of the city and county of St. Louis and State of Missouri, have invented a certain new and useful Improvement in Halters and Bridles, of which the following is a full, clear, and exact description, reference being had to the accompanying drawings, making part of this specification.

My improvement consists, mainly, in making the side pieces in the same strap with part of the throat-lap, each strap being continuous over the horse's poll, where they preferably pass through a loop or over a pad (as shown) so as to hold them in relative position, and prevent them from rubbing the poll of the animal. The loop or pad may be made of leather or any other suitable substance.

In the drawings, Figure 1 shows a halter containing my improvement. Fig. 2 shows a bridle.

A is the nose-band whose ends are secured in the rings B B. C is the chin-strap, which is passed through the rings B, and whose ends are secured together by a buckle, c, to give means for adjustment. D is the hitch-strap ring, through which the chin-strap passes. E is the bolt, passing through the ring D, and resting in the bottom of loop f of the bolt-piece F. The loop f' is transversely perforated or slit to allow the passage of the ring D above the bolt. The throat-latch passes through the upper loop f' of the bolt-piece.

All the above-described parts are similar in construction and arrangement to the ordinary halter of this class.

G and H are straps secured at bottom to the side rings B B, like the ordinary cheek-straps of a halter; but the straps G and H, unlike the ordinary cheek-straps, extend over the pole of the horse and down the opposite side of the neck, where they form the throat-latch. The end of the strap G has a buckle, g, in which the end h of the strap H engages. This gives means for the adjustment of the halter in size, both as to the cheek-straps and the throat-latch, by single buckle.

At the top of the horse's head the straps G and H lap across each other; and at that place they preferably pass through a loop, I, as shown in Fig. 1, or over a flexible or inflexible piece of leather or other material, I, as shown in Fig. 2.

In Fig. 2 my improvement is shown as applied to a bridle; and in this case the chin-strap and bolt-piece may be dispensed with, and the hitch-strap may be connected to a bit-ring or one of the straps D. In this case it will be seen that when the horse draws on the hitch-strap the strain will tighten the throat-latch, and the horse will be induced to relieve the hitch-strap from strain; or, the hitch-strap may be connected to the throat-latch, and then any strain upon the hitch-strap would come upon the bit, and prevent the horse from moving forward.

I claim for my improvement the following advantages over common halters and bridles: It has greater strength, because the straps G H are continuous, and are double over the head. Less material is required, because there is only one buckle used for both straps G and H, and they are continuous with the throat-latch, whereas, where they are separate one buckle at least in addition is needed, requiring additional leather for buckle-lap.

The decrease in the number of buckles and rings used, and amount of leather used, makes it cheaper in construction. Its additional strength and avoidance of seams make it more durable. It may easily be put on the horse's head without unbuckling the throat-latch buckle g, as the throat-latch may be enlarged by slipping the straps in the loop I.

I claim herein as new and of my invention—

1. The combination, in a halter or bridle, of the straps G H, each of which forms one of the cheek-straps, and also part of the throat-latch, substantially as set forth.

2. In combination with the straps G and H, the loop or pad I, protecting the poll from the rubbing of said straps and holding them in proper relative position, as set forth.

JACOB STRAUS.

Witnesses:
SAML. KNIGHT,
JAS. B. AUSTIN.